United States Patent [19]
Czerniejewski

[11] Patent Number: 4,704,694
[45] Date of Patent: Nov. 3, 1987

[54] LEARNED PART SYSTEM

[75] Inventor: Frank R. Czerniejewski, Longwood, Fla.

[73] Assignee: Automation Intelligence, Inc., Orlando, Fla.

[21] Appl. No.: 809,208

[22] Filed: Dec. 16, 1985

[51] Int. Cl.$^4$ ............................................. G06F 15/46
[52] U.S. Cl. ...................... 364/513; 901/47; 364/478; 209/576; 356/388; 358/101; 382/25; 382/43
[58] Field of Search ...................... 364/513, 513.5, 576, 364/478; 901/47; 356/388, 389, 390–398; 209/576–579; 382/25, 43; 358/101

[56] References Cited

U.S. PATENT DOCUMENTS

| | | | |
|---|---|---|---|
| 4,017,721 | 4/1977 | Michaud | 364/506 |
| 4,613,269 | 9/1986 | Wilder et al. | 364/478 |
| 4,624,367 | 11/1986 | Shafer et al. | 364/576 |

Primary Examiner—Jerry Smith
Assistant Examiner—Allen MacDonald
Attorney, Agent, or Firm—Macdonald J. Wiggins

[57] ABSTRACT

A system for learning a characterization of an object and thereafter identifying the presence and orientation of the object is capable of controlling a robotic system for grasping the object. In an off-line learning mode, a television camera produces a video signal from the object and a preprocessor develops a segmented line outline of the object in digital form. A computer is programmed to generate a mathematical "rubber band" or convex hull around the object outline formed from segmented lines and to store the x-y coordinates of the lines. The centroid of the hull is calculated and an $R(\emptyset)$ function as the radius from the centroid to the hull with the maxima thereof is calculated for characterizing the orientation of the object. A truncated Fourier series of the $R(\emptyset)$ function is generated and the coefficients stored. In an on-line characterization mode, the apparatus generates a characterization of an unknown object and compares it with the learned and stored values of $R(\emptyset)$ and Fourier coefficients. Upon identification of the object, the orientation is calculated by comparing the shift in $\emptyset$ from the stored reference values.

6 Claims, 9 Drawing Figures

LEARNED PART SYSTEM

BACKGROUND OF THE INVENTION

1. Field of the Invention

The present invention relates to identification of articles on a production line or the like, and more particularly to apparatus for learning a characterization of an object and thereafter identifying the presence and orientation of the object for control of robotic systems.

2. Description of the Prior Art

With the continuing automation of manufacturing processes which includes automatic assembly of products, there is a need for apparatus to control robotic arms and other automatic machinery. For example, a part may be being carried to a point of assembly and thereafter be grasped by a robotic arm and placed in the proper location on the product by the arm. The assembly system must first be able to recognize the presence of the part and also its orientation since generally there is only one orientation with respect to the device being assemblied for which the part will fit. In many cases, human labor is used to identify and orient parts for subsequent automatic installation or assembly.

Apparatus is known in the art which can, through the use of video techniques, identify objects using gray scale techniques. For example, the GVS-41 system originally developed for the military has been used in the past for this purpose. Although it is known to use the GVS-41 system for robotic control systems, there have been problems in operating under difficult and variable lighting conditions which is particularly important in factory environments where lighting control is usually impractical.

The following papers are known which relate to the problem of identifying parts and guiding robotics:

L. M. Sweet et al, "Processing of Contour and Binary Images for Vision-Guided Robotics", Conference on CAD/CAM Technology in Mechanical Engineering, MIT, Cambridge, Mass., March, 1982

W. A. Perkins, "A Model-Based Vision System for Industrial Parts", IEEE Transactions on Computers, Vol. C-27, 1978

K. E. Price, "Matching Closed Contours", Seventh International Conference on Pattern Recognition, Montreal, Canada, July, 1984

S. G. Akl and G.T. Toussaint, "Efficient Convex Hull Algorithms for Pattern Recognition Applications", National Research Council of Canada There is a need for a system which will permit a vision system such as a GVS-41 to quickly learn the characteristics of a part in an off-line mode, and to thereafter in an on-line mode recognize the part and its orientation. Such a system then should then be able to control a robotic arm to grasp the part and reorient to the required position.

SUMMARY OF THE INVENTION

The present invention provides a system for off-line characterizing and storing the characterization of a two dimensional image of an object. When on-line, the method and system provides for identifying the presence of the object and its orientation.

The apparatus utilizes a television camera for monitoring the object, which may be a part on an assembly line or the like. The video output signal is directed to a preprocessor which enhances the outer edges of the object and digitizes the signal. The processed signal is fed to a computer having a novel program that mathematically characterizes the shape and orientation of the object. The computer operates a video monitor which the operator observes during the off-line learning phase and which shows the object and a characterizing outline generated by the computer as an overlay. During on-line use of the apparatus, the computer interfaces with a robotic arm for handling a recognized object to grasp the object for reorientation, if necessary, and for placement of the object at a desired location.

The monitor camera provided may have a resolution of 256×240 pixels. When the characterization of an object is to be determined, the system is used in an off-line mode and the object to be characterized is placed within the field of view of the camera. The video signal produced by the camera is processed to produce digital data representative of the two dimensional outline of the object. A monitor is connected to the camera and processor to permit viewing of the object. A computer receives the video data and is programmed to define an outline of the object; such outline can be visualized as a mathematical "rubber band" stretched over the object and will be in the form of line segments representative of the outline which are fed to the monitor to permit visual observation thereof. The centroid of the object is calculated by well known methods. The distance from the outline to the centroid is then determined in polar coordinates by defining a radius R as a function of an angle $\phi$. The coordinates may then be stored in a memory.

When the system is on-line, the same process is followed and the coordinates and the outline of an unknown object are measured and compared to the stored coordinates. If a match of radius coordinates is found having the same angles, usually including a common phase shift, the identification of the object is made. The orientation of the object is then determined by measuring the phase shift between the measured set of angles and the stored set of angles.

The R ($\phi$) characterization is satisfactory to define straight edge objects since corners produce peaks in the value of R. However, objects having curved edges produce a large number of short segments around the curves thereby producing false "peaks". It has been found that an improved characterization is obtained by utilizing a Fourier series representation of R ($\phi$). Each term of the sine or cosine Fourier series produces a signature and will give an accurate indication of the rotation of the object even though the R ($\phi$) curve is a poor fit and only a few Fourier terms are used. Truncating the series at the fourth term has been found to yield a satisfactory characterization.

The process of mathematically generating a "rubber band" around an object is also referred to as forming a convex hull. The Fourier series for the hull radius as a function of angle $\phi$ may be expressed as $$R(\phi) = A_o + A_1 \cos(\phi + \alpha_1) + A_2 \cos(2\phi + \alpha_2) + A_3 \cos(3\phi + \alpha_3) + A_4 \cos(4\phi + \alpha_4) + \ldots$$

When the system is in the off-line mode for learning an object, the coefficients $A_n$ and the phase angles $\alpha_n$ are calculated for the object. When the system is in the characterizing or on-line mode, the same object will produce the same $A_n$ coefficients within statistical limits which will therefore identify the object. If the object is rotated, the measured phase angles $\alpha_n$, will be found to have changed by n times the amount of rotation of the part from the stored position.

It may be recognized that this characterization may not be sufficient for symmetrical objects and for different objects having identical hulls. For a symmetrical object, some of the Fourier coefficients will be zero or below a threshold because of statistical differences. A threshold of 2% of the $A_o$ term has been found to be satisfactory. Rotation is then necessarily determined from the higher Fourier terms.

To resolve the identical-hull problem, the computer during the learning phase, checks the generated hull and is programmed to indicate if a new piece has the same Fourier coefficients, perimeter and area of a previously characterized object within statistical limits. In such case, the operator observes the object displayed on the monitor and can move a cursor around the monitor screen which defines a circular or polygon window that becomes part of the characterization. The window is selected to outline an internal part of the object such as a hole which differs from the previously characterized part. This technique is also used for symmetrical objects by placing a window around an internal feature of the object to permit rotation to be detected without ambiguity during on-line operation.

As will now be recognized, the invention provides a system for learning and storing shape, size and orientation characteristics of an object, such as a part of product, from a two-dimensional view thereof in an off-line mode. The system may then be disposed along a conveyer or the like and utilized to identify any of the characterized objects and to determine the orientation thereof with respect to the original orientation. These data are then available from the computer to control a robotic arm for grasping, sorting or other operations involving the object.

It is therefore a principal object of the invention to provide a system for learning the profile and orientation of an object, storing data defining the object off-line, and for recognizing the object and its orientation on-line.

It is another object of the invention to provide a system for controlling a robotic mechanism to handle a recognized object.

It is still another object of the invention to provide a system having a video camera for producing video signals representations of an object and a computer for utilizing the signals to define a convex hull mathematically that represents the shape and orientation of the object.

These and other objects and advantages of the invention will be obvious from the following detailed description when read in conjunction with the drawings.

DETAILED DESCRIPTION OF THE PREFERRED EMBODIMENT

Figure 1:
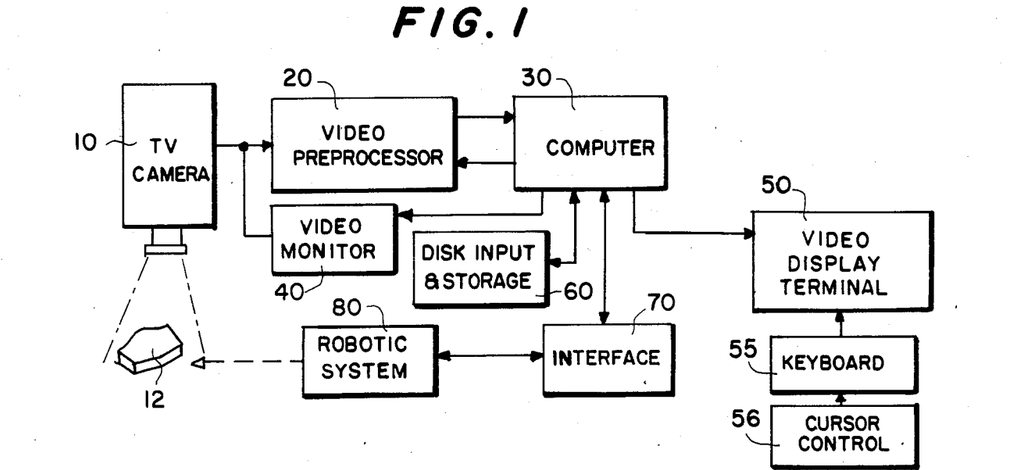
FIG. 1 is a simplified block diagram of the system of the invention.

The present invention utilizes a vision system such as the GVS-41 having a computer controlled by a novel program by use of which the system can characterize an object or part off-line and later identify the part on-line. Turning first to FIG. 1, a simplified block diagram of the system is shown. A tv camera 10 is provided which may be standard vidicon type, a solid state charge coupled devices camera, or a charge injection devices camera. In the field of view of camera 10 is shown an object 12 which will produce an analog video signal at the camera output. Preferably, tv camera 10 produces standard component video (EIA-RS 170). The RS 170 output also feeds video monitor 40 which is a standard monochrome monitor. This monitor 40 permits the operator to monitor the location of object 12 within the field of view of camera 10.

Video preprocessor 20 serves to digitize the analog video signal received from camera 10 and buffers the frames of digitized video data. It also processes the digital signal to improve edge detection of objects and to extract line segments from the signal to be used in the subsequent characterization of the object 12. Straight line segments will be used to define the internal and external edges of objects. The preprocessor 20 also groups the data and stores it for subsequent use and generates alphabetic messages and edge outlining for display on monitor 40. Computer 30 is programmed to accept the preprocessed information from video preprocessor 20 and to analyze these data to derive the specific mathematical functions which are used to characterize and identify object 12. As will be described in detail hereinafter, the computer performs the learning function and stores the learned parameters in storage unit 60 during the learning mode and will compare information received from video processor 20 during the operate mode with stored part characteristics and will determine the presence and orientation of a known part. The computer is under the control of an operator during the learning phase via a terminal 50 which includes a video display and is connected to keyboard 55 and cursor control 56. Video display terminal 50 will indicate to the operator the functions being performed by the program and computer 30 and permits real time inputs to the computer as required. The disc input in storage 60 permits desired programs to be installed in computer 30. As computer 30 develops the characterization information, it is displayed on video monitor 40 for observation by the operator. Thus, video monitor 40 includes the image seen by camera 10 and the characterization data generated by computer 30.

During on-line use of the system in which the computer 30 will recognize a learned object 12, it will also determine the orientation of object 12 with respect to the learned position. Interface 70 will accept control signals from computer 30 to cause robotic system 80 to grasp object 12 and to orient it to a preselected position and will receive location information from robotic system 80 for computer 30.

Figure 2:
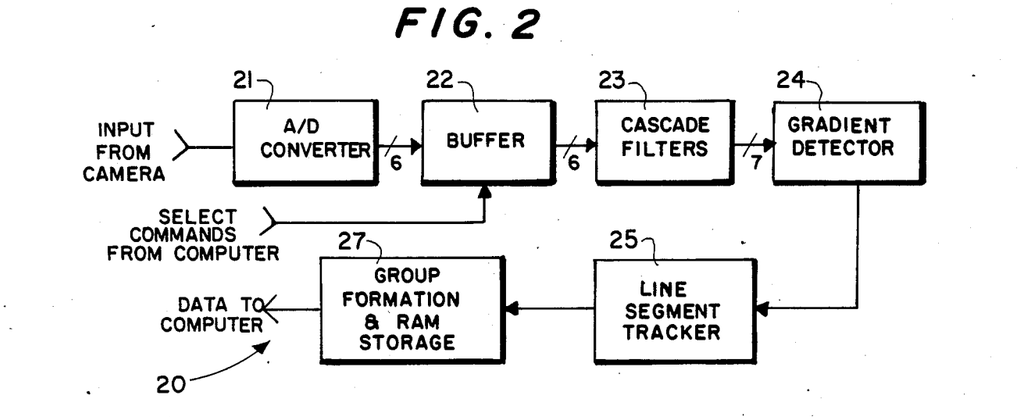
FIG. 2 is a block diagram of the preprocessor of FIG. 1.

Referring now to FIG. 2, details of video processor 20 are shown. The input from camera 10 to the analog-digital (A/D) converter 21 a sequence of normal 240 line interlaced fields. Each field is converted to a digital representation of the amplitude. Each field consists of 240 or 480 raster lines of data and either 256 or 512 digital samples of the analog information is taken along each raster line to define pixel size. The higher value gives high resolution while the lower value achieves greater speed. The 512 pixel value produces a sample every 88 nanoseconds. The analog gray scale is defined by six bits of binary data with 0 representing white and 63 representing black. Buffer 22 stores the digitized data. Computer 30 instructs buffer 22 whether to select two fields of data per frame or a single field and 256 or 512 samples depending upon the speed required and resolution. Where multiple cameras may be used, the computer would also select the camera in use. Following buffer 22 is a set of cascaded digital filters. Various modes of filtering are selectable such as median, averaging, or none. The output from filters 23 is directed to gradient detector 24. The gradient detector looks at the gray scale differences between adjacent pixels to locate edges of the image. It assigns a gradient vector having an amplitude between 0 and 15 and a direction between 0 and 7. Thus, the result of the gradient detector 24 is a decision as to whether a portion of an image is an edge of the object in the camera FOV. When lines which represent line segments are detected, these are "thinned".

A line segment tracker 25 compares the gradient vectors for four adjacent pixels. Whenever the directions of these vectors are compatible, the pixels are connected into a straight line segment. When a maximum length of segment line is reached, the coordinates at each end are output as a line segment value defined by the x and y values thereof. These are formed into groups and stored in ram storage 27.

Figure 3A:
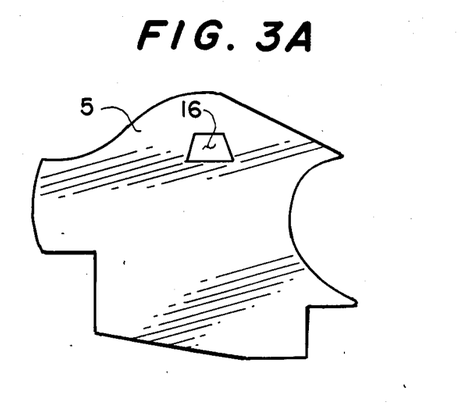
FIG. 3A is a typical object to be learned by the system.
Figure 3B:
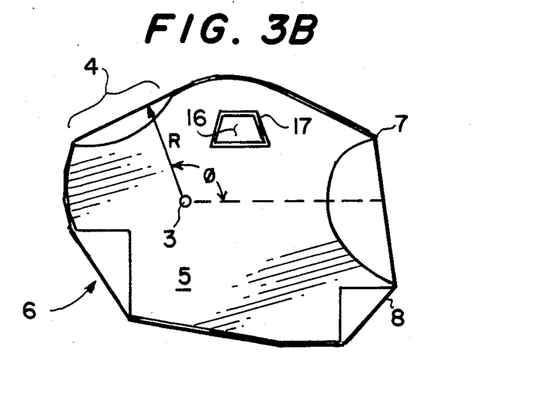
FIG. 3B is the object of FIG. 3A having a convex hull generated around the perimeter thereof.

Referring now to FIGS. 3A and 3B, the results of preprocessing of the video signal may be noted. An object 5 is shown in FIG. 3A which is to be characterized by the system of the invention. Preprocessor 20 stores the x-y values of line segments defining the perimeter of object 5. The computer then uses the edges detected by the preprocessor to produce an outline 6 around object 5 which may be referred to as a mathematical rubber band since it takes on the approximate shape of a rubber band around the outline of a two dimensional representation of the object 5. As will be noted, the outline 6 which is referred to as a hull, conforms to the convex borders of object 5. It also may be noted that there will be a change in direction of the outline at corners such as points 7 and 8 with hull 6 forming a straight line between two such adjacent points. Similarly, concave regions also result in a straight line segment as indicated at 4.

When object 5 is placed in the field of view of camera 10 during the learning phase, the analog video image thereof will be seen by the operator on video monitor 40. As video processor 20 and computer 30 generate outline 6, the perimeter will also appear on video monitor 40 as shown in FIG. 3A. The computer will inform the operator whether there are symmetries or other characteristics of the object 5 which may require additional characterization as will be described.

As previously described, hull 6 is produced in digital form and the x-y location of each pixel forming hull 6 will be stored in a suitable table. Computer 30 then calculates the area and perimeter of the hull 6 and this information in combination with the Fourier transform data will identify a part when that part is unique.

Next, the centroid 3 of the hull is calculated by the computer. It is to be understood that the controid 3 of the hulls is calculated and not that of the actual part. However, the actual part centroid will be a constant vector from the hull centroid 3.

Figure 4:
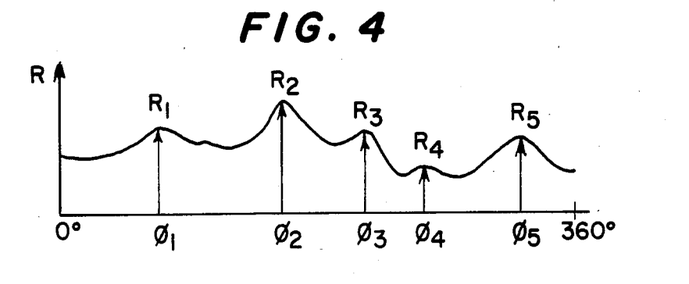
FIG. 4 is a typical plot of $R(\phi)$ for a learned object.
Figure 5:
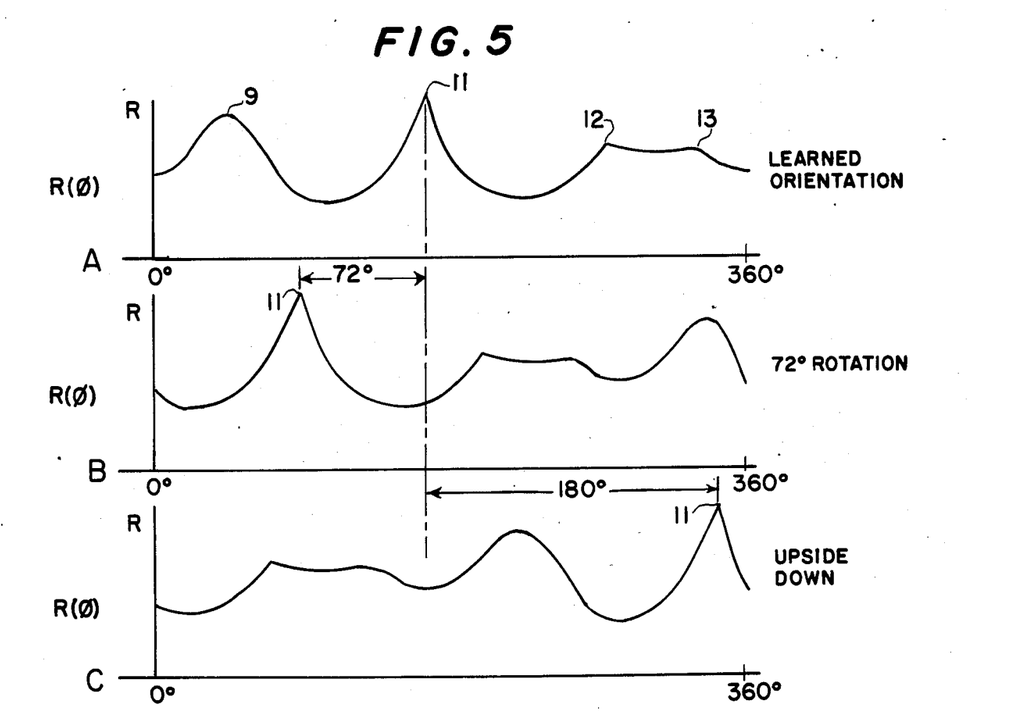
FIG. 5 is a set of plots of a function $R(\phi)$ for an object showing a reference plot, a plot showing rotation, and a plot showing the object inverted.

To determine the reference orientation of part 5 during the learning process, the value of the radius from centroid 3 to hull 6 is calculated by the computer as a function of angle $\phi$. This will be the function $R(\phi)$. A plot of this function for an exemplary part is shown in FIG. 4. A reference angle of zero degrees for $\phi$ is selected and the maxim of radius R is noted as a function of $\phi$. As indicated in FIG. 4, a set of function values $R1(\phi_1)$ through $R5(\phi_5)$ is shown. For many parts which have straight sides without curved profiles, the single valved $R(\phi)$ function with a set of discrete maxima characterize the part and permits determination when the part is later rotated from the original orientation as indicated in FIG. 5. In line A of FIG. 5, the learned orientation of a part is indicated in which there are four maxima 9, 11, 12 and 13. On line B, the same part has been rotated 72 degrees causing each maxima to shift by that amount. Thus, the system would calculate this rotation by comparing the value of $\phi$ for each maxima, subtracting from the stored value of $\phi$ at each maxima and averaging the differences. A special case when the part is upside down is indicated on line C as shown by a 180 degree difference between the maximum peaks.

The method of determining rotation of the part described above fails when parts have curved surfaces. It is to be understood that the computer in producing a hull around a part generates curves by short straight line approximations of the curves which can produce false non-reproducible maxima. In accordance with the invention, the computer utilizes a different approach in determining rotation of curved profile objects. First, the single valued $R(\phi)$ function is generated as previously described. The computer then calculates the Fourier series representative of the $R(\phi)$ function and each term of the series may then be used as a signature characterizing the part and its orientation. As will be understood, each term of an all sine or all cosine Fourier series gives an indication of the rotation of the part even though the fit of the $R(\phi)$ curve may be poor when only a few Fourier terms are used.

As previously mentioned, the Fourier series for the radius of the hull with respect to the centroid as a function of the angle $\phi$ is as follows:

$$R(\phi) = A_0 + A_1 \cos(\phi + \alpha_1) + A_2 \cos(2\phi + \alpha_2) + A_3 \cos(3\phi + \alpha_3) + A_4 \cos(4\phi + \alpha_4) + \ldots$$

Although as many terms as desired may be included, it has been found that truncating the series at the fourth term is adequate.

During the off-line learning mode, the computer will calculate the A coefficients and the phase angles $\alpha$ for a part. During on-line operation, when that part is in the view of the camera, the same calculations will produce the same set of coefficients within statistical limits. The computer then compares the set of coefficients found with the stored coefficients to identify the part. Each phase angle will be different if the part is rotated from the orientation during the original learning mode and the rotation will be indicated by the difference between the stored phase angles and the rotated phase angles.

The computer calculates the rotation angle by averaging the values found from each term of the series and then controls the robotic arm to grasp the part by moving to the centroid position offset by the previously learned pickup point vector and by rotating its wrist to the calculated rotation angle.

The above-described procedure for identifying and determining orientation of a learned part is not usable when a part is symmetrical or when parts have identical hulls but are internally different within the hull.

In the case in which different parts have the same hull, a windowing technique is used to distinguish between such parts. For example, assume that part 5 in FIG. 3 has the same hull as a different part. When the part 5 is being learned off-line, the computer 30 would compare the area, perimeter, and Fourier coefficients with previously stored parameters of other parts in storage 60. When it notes the existence of an almost identical part, a message is displayed on video display terminal 50 to the operator. The operator may note that part 5 includes a unique aperture 16 within the outline. Using cursor control 56, the operator moves the cursor around aperture 16 to define a circular or polygon shaped window 17. The computer will then store the ordered x-y coordinates of the window around aperture 16 along with the other characteristics previously determined. These data then will permit the computer to distinguish between the two different parts having a similar hull.

When a problem is noted due to the symmetry of an object in determining orientation since this causes some Fourier coefficients to be zero, the operator will be alerted by computer 30 and can use an internal asymmetry of the part to produce a window within the perimeter that will allow an unambiguous orientation angle to be determined.

As will be understood, the computer 30 may utilize both or either the peak $R(\phi)$ values and the Fourier series method in testing for angular rotation of a part and the result producing the least deviation in individual estimates will be chosen.

Figure 6A:
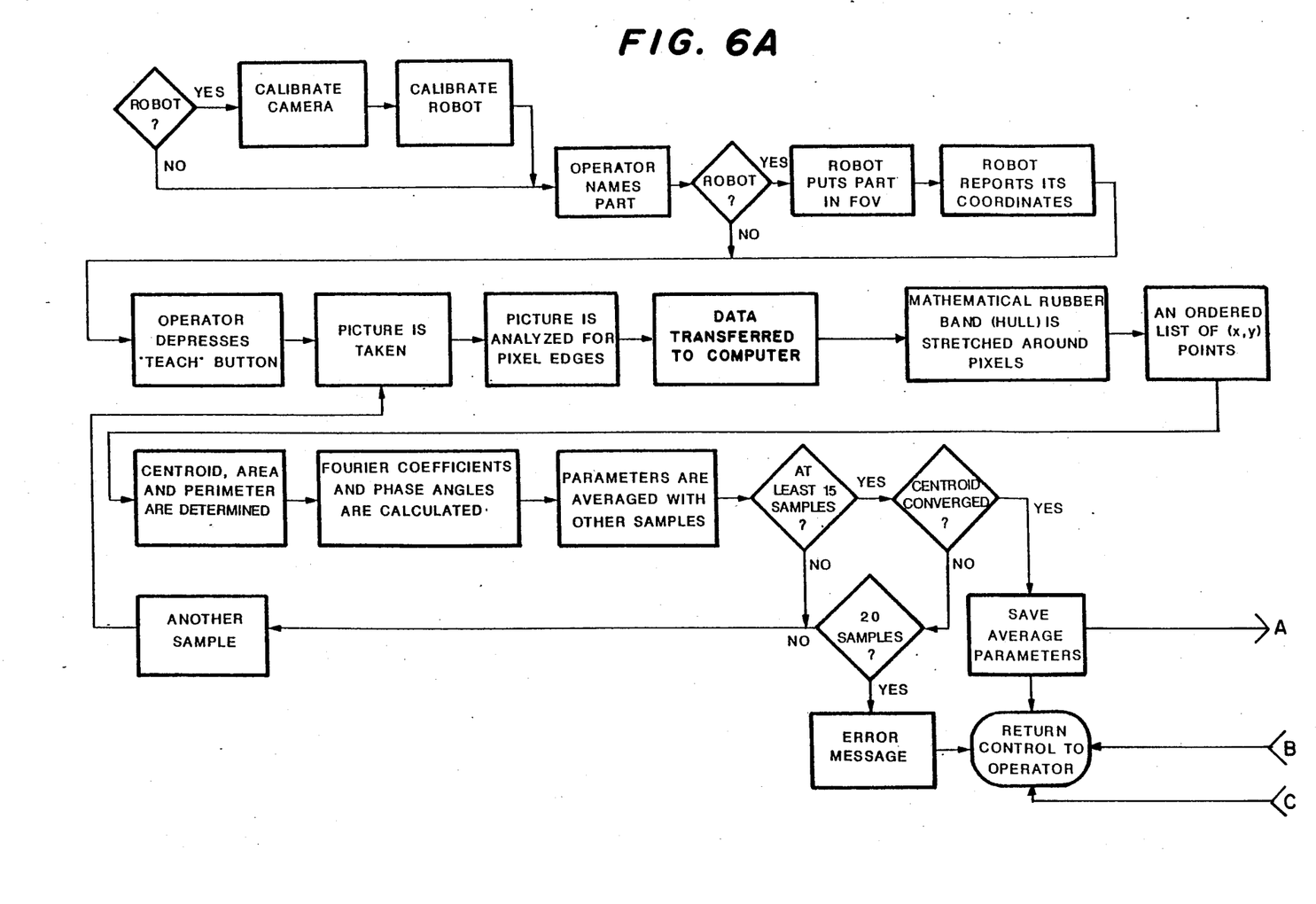
FIGS. 6A and 6B show a functional flow diagram of the system of the invention during a learning mode.
Figure 6B:
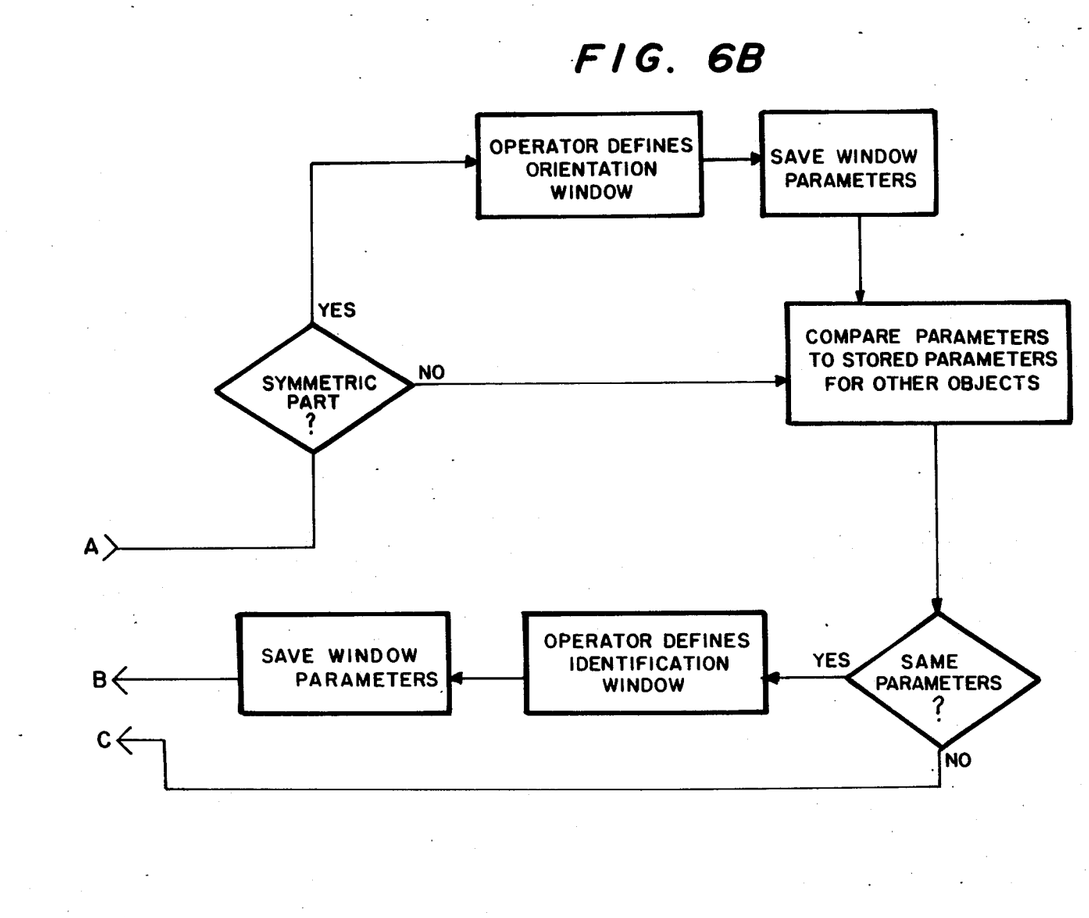

FIG. 6 is a flow diagram which defines the operations performed by the user during the learning mode of the invention and the operations performed by the computer under control of the program. As will be noted, the learning phase will take place normally in combination with a robotic apparatus which will be used during the characterization phase. However, this is not necessary and a part can be learned without the robotics elements. When the robot is present, the first step is to calibrate the camera to determine the ratio of the length units of the part to the camera pixel units and the ratio of the incremental y value to the incremental x value of a small size pixel box. These two ratios are used by the computer in converting the pixels to the length unit which will be used by the robot. After calibration, the part seen on the monitor screen is named by the operator and stored by the computer in storage 60. The robot moves the part into the field of view of the camera and reports its coordinates to the computer via interface 70. The operator then enters a teach command into terminal 50 causing the computer 30 to direct video preprocessor 20 to accept a sample frame of the picture being seen by the camera. The preprocessor 20 analyzes the digitized representation of the analog signal from tv camera 10 to determine the pixel edges. The computer generates a hull around the perimeter of the object and defines the line segments in terms of an ordered list of x-y points. These are stored by the computer in storage 60.

Next, the computer program determines and records the centroid of the hull, the area of the hull, and the perimeter of the hull. From these data, the radius vector from the centroid to the hull as a function of angle is calculated and stored. The Fourier coefficients and phase angles to at least the fourth term are calculated and stored in storage 60. The computer will accept at least 15 samples, for statistical averaging. After more than one sample is obtained, all of the parameters determined are averaged with the other samples. This process is iterated until at least 15 samples have been obtained. If at this point, the centroids have converged within an acceptable limit, the average parameters are then stored in storage 60. If the centroids fail to converge, additional samples are taken to average over a total of at most 20. If convergence is still not obtained, an error message is generated and the operation is halted to determine the problem.

After convergence of the centroid samples, the parameters are compared to those already stored for other parts. If the same set of parameters is found, a message is provided to the operator on the terminal display and the operator then defines an internal window. An additional set of parameters is then calculated by the computer as previously described and the modified set of parameters is stored. If there are no previously stored parts having the same parameters, the computer checks to see if the part is symmetric as would be indicated by missing Fourier terms. If so, the operator is alerted, defines an internal window and the part is reanalyzed and the modified parameters stored.

Figure 7:
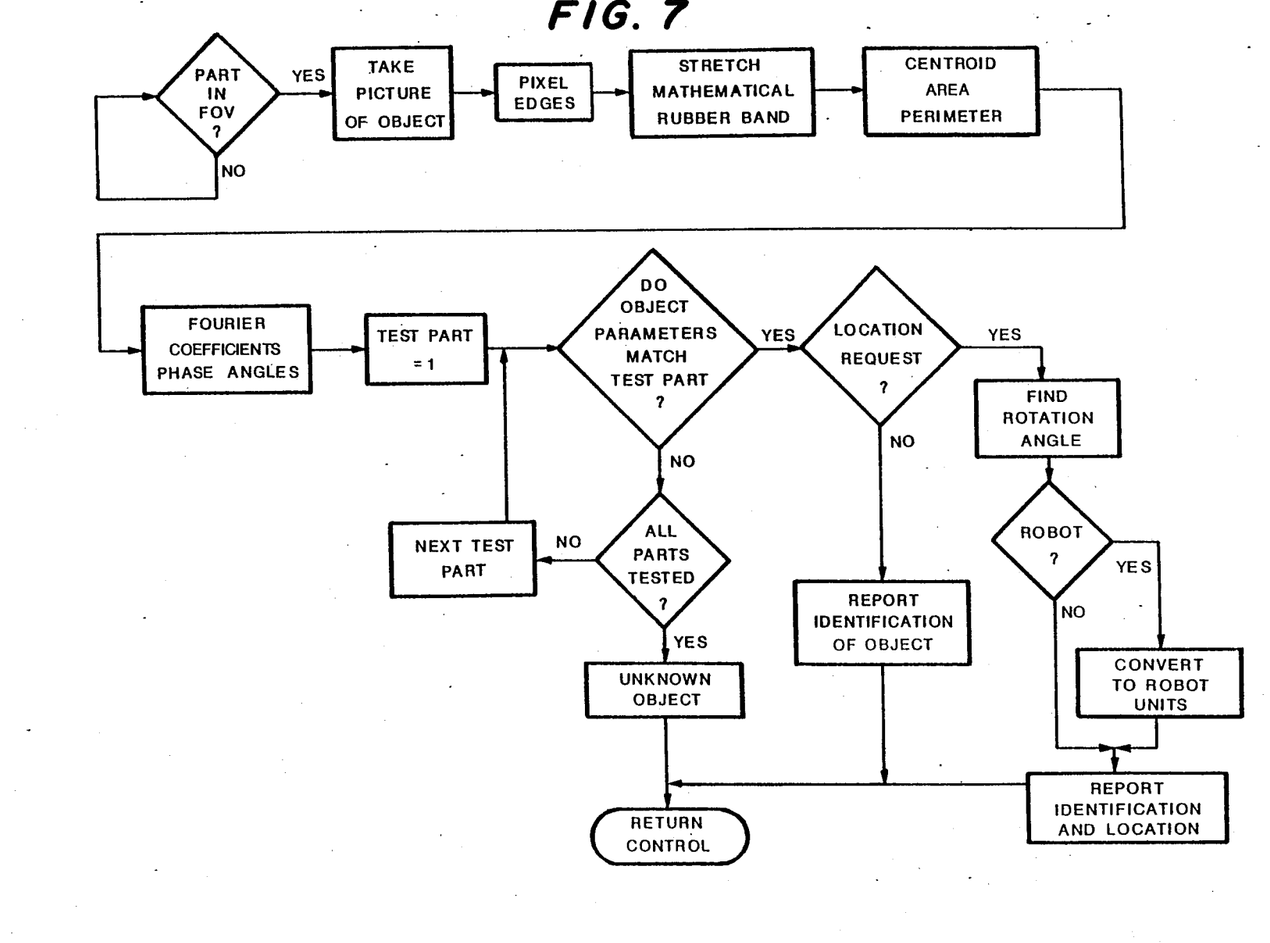
FIG. 7 shows a functional flow diagram of the system of the invention during a characterization mode.

A flow diagram showing the computer operations during the characterization mode is shown in FIG. 7. When a part coming down a conveyor or the like moves into the field of view of the camera, a picture is taken of the object and the pixel edges defined in preprocessor 20 as previously described. The computer in conjunction with the preprocessor edge pixels defines the hull, the centroid, the area, and the perimeter and then calculates the Fourier coefficients and phase angles of the $R(\phi)$ function derived from the hull. The computer then steps through all of the stored parameters for previously learned parts until a match is found. If the match indicates that the angles in the Fourier series representation of the $R(\phi)$ function differ from the stored values, the computer then calculates the angle of rotation relative to the taught reference angle. If a robotics system is coupled to the characterization system, the computer applies the calibration factors and gives the robot the pickup position and wrist rotation of the object for grasping. If the requirement is to identify and locate the object, this information is now displayed on the monitor screen and the operation is complete. If the location and amount of rotation is not required, the identification of the object is reported on the monitor and the operation is complete.

After testing all of the parts stored in memory and no match is found, then it is indicated to the operator that an unknown object is present to permit corrective action.

As will now be understood, an apparatus has been described which is capable of learning certain repeatable characteristics of an object and thereafter identifying the presence, location, and orientation of the object. The apparatus may include a robotic system and control the robotic system to allow retrieval of the identified objects. The apparatus includes a computer programmed to define a hull around a part and if necessary internal windows. The hull and windows are then analyzed to produce a single valued function and the Fourier series representative of that function is generated to provide a signature in the form of a unique set of coefficients for the part. Preferably, the analog signal from a tv camera in the apparatus is preprocessed to rapidly and quickly provide the computer with the minimum data needed for characterization of a part. Although a specific implementation has been disclosed, it will be apparent to those of skill in the art to make various modifications without departing from the spirit and scope of the invention.

I claim:

1. A system for characterizing an object in a first orientation thereof, said system having a learning mode and an identifying mode, comprising:
    (a) camera means for producing video signals representative of the outline of an object to be characterized in the learning mode and of an object to be identified in the identifying mode;
    (b) signal processing means connected to said camera means for detecting the edges of said outline from said video signals and for producing digital signals defining a multiplicity of straight line segments by a first set of x-y coordinates representative of said outline, said processing means including first storage means for storing a table of said first set of x-y coordinates;
    (c) computer means connected to said processing means and having first program means for forming a convex hull around said outline by defining a second set of x-y coordinates and calculating characterizing parameters of said object from said second set of x-y coordinates, said parameters including
        (i) a centroid of said convex hull,
        (ii) an area of said convex hull,
        (iii) a radius R of said convex hull as a function of angle $\phi$ with respect to said first orientation of the object thereby producing a single valued mathematical function $R(\phi)$ defining said convex hull, and
        (iv) a Fourier series representation of said hull defining function $R(\phi)$ truncated at a preselected number of terms; and
    (d) second storage means connected to said computer means for storing said calculated characterizing parameters when said system is in the learning mode;
    (e) second program means programmed into said computer means for comparing characterizing parameters produced from another object, when said system is in the identifying mode, to characterizing parameters previously stored in said second storage means and for identifying such previously stored characterizing parameters which are essentially the same as said characterizing parameter of said other object so as to identify such other object; and
    (f) third program means programmed into said computer means for calculating the difference between the angle $\phi$ of the hull defining function $R(\phi)$ of said other object and the angle $\phi$ of said identified previously stored characterizing parameters thereby determining the amount of rotation of such other object with respect to the orientation of the object producing such stored parameters during said learning mode.

2. The system as defined in claim 1 in which said third program means further includes means for calculating the difference in the angle of the arguments of the said Fourier series representation of said hull defining function $R(\phi)$ of said other object and the arguments of the stored Fourier series representation of an $R(\phi)$ function of said identified previously stored characterizing parameters thereby determining the amount of rotation of such other object with respect to the orientation of the object producing such stored Fourier series during said learning mode.

3. The system as recited in claim 1 which further comprises:
    a video monitor connected to said camera means for displaying said outline produced by said signal processing means, said monitor having a cursor;
    cursor control means for moving said cursor to form a window within said outline on said monitor; and
    in which said first program means includes means for forming a hull around said window by defining a third set of x-y coordinates and storing said third set of x-y coordinates in said second storage means.

4. In a system having a plurality of objects and a robotic system for handling objects, apparatus for learning objects in an off-line mode, for identifying learned objects in an on-line mode and for controlling said robotic system to grasp such objects comprising:
    a television camera for producing an analog video signal of an unknown object within its field of view;
    an analog to digital converter connected to said camera for digitizing said analog video signal;
    a gradient detector connected to said analog to digital converter for detecting the edges of an outline of said object from said digitized video signal and producing a set of straight line segments representative of said outline;
    first storage means connected to said gradient detector for storing coordinates of said straight line segments;
    computer means for accessing said first storage means for forming a convex hull around the representation of said outline, said hull being represented as a multiplicity of straight line segments, and for calculating the centroid and the area of said hull;
    said computer means comprising means for calculating a function $R(\phi)$ in which R is the radius from said centroid to said hull and $\phi$ is the angle of said radius with respect to a selected axis wherein maxima of said function define the orientation of said object with respect to said axis;
    second storage means connected to said computer means for storing said function when said system is in the off-line mode, said computer means comprising means for comparing, when said system is in the on-line mode, said function with functions stored in said second storage means to identify said unknown object and to calculate the orientation of said unknown object with respect to said axis; and
    interface means for connecting said computer means to said robotic system for controlling said system to grasp said object.

5. The system as recited in claim 4 in which:
    said computer means comprising means for calculating a truncated Fourier series representation of said $R(\phi)$ function; and
    said second storage means is also for storing the coefficients and arguments of each term of said calculated Fourier series when said system is in the off-line mode.

6. The system as recited in claim 5 in which said computer means comprising means for comparing the coefficients and arguments of each term of said calculated Fourier series when said system is in the on-line mode with said stored coefficients and arguments to thereby identify said unknown object by said coefficients and the orientation thereof by said arguments.

* * * * *